US011714903B1

(12) United States Patent
Jia et al.

(10) Patent No.: US 11,714,903 B1
(45) Date of Patent: Aug. 1, 2023

(54) # SAMPLE TRAFFIC BASED SELF-LEARNING MALWARE DETECTION

(71) Applicant: Palo Alto Networks, Inc., Santa Clara, CA (US)

(72) Inventors: Yanhui Jia, San Jose, CA (US); Matthew W. Tennis, Santa Clara, CA (US); Stefan Achleitner, Arlington, VA (US); Taojie Wang, San Jose, CA (US); Hui Gao, Sunnyvale, CA (US); Shengming Xu, San Jose, CA (US)

(73) Assignee: Palo Alto Networks, Inc., Santa Clara, CA (US)

( * ) Notice: Subject to any disclaimer, the term of this patent is extended or adjusted under 35 U.S.C. 154(b) by 0 days.

(21) Appl. No.: 17/877,811

(22) Filed: Jul. 29, 2022

(51) Int. Cl.
*G06F 21/56* (2013.01)
*G06F 21/53* (2013.01)
*G06N 5/022* (2023.01)

(52) U.S. Cl.
CPC .............. *G06F 21/56* (2013.01); *G06F 21/53* (2013.01); *G06N 5/022* (2013.01); *G06F 2221/031* (2013.01)

(58) Field of Classification Search
CPC .... G06F 21/56; G06F 21/53; G06F 2221/031; G06N 5/022
See application file for complete search history.

(56) References Cited

U.S. PATENT DOCUMENTS 9,165,142 B1 * 10/2015 Sanders .............. H04L 63/1416
11,010,474 B2 * 5/2021 Hu ........................ G06F 21/568

OTHER PUBLICATIONS

Buchanan et al., On Generating and Labeling Network Traffic with Realistic, Self-Propagating Malware, May 27, 2022.
Cobalt Strike, Software for Adversary Simulations and Red Team Operations, Jul. 25, 2022.
Li et al., A Machine Learning Framework for Domain Generation Algorithm-Based Malware Detection, 2019.
Livadas et al., Using Machine Learning Techniques to Identify Botnet Traffic, BBN Technologies, Nov. 2006.

(Continued)

*Primary Examiner* — Beemnet W Dada
(74) *Attorney, Agent, or Firm* — Van Pelt, Yi & James LLP

(57) ABSTRACT

Techniques for sample traffic based self-learning malware detection are disclosed. In some embodiments, a system/process/computer program product for sample traffic based self-learning malware detection includes receiving a plurality of samples for malware detection analysis using a sandbox; executing each of the plurality of samples in the sandbox and monitoring network traffic during execution of each of the plurality of samples in the sandbox; detecting that one or more of the plurality of samples is malware based on automated analysis of the monitored network traffic using a command and control (C2) machine learning (ML) model if there is not a prior match with an intrusion prevention system (IPS) signature; and performing an action in response to detecting that the one or more of the plurality of samples is malware based on the automated analysis of the monitored network traffic using the C2 ML model. In some embodiments, the IPS signatures and C2 ML model are automatically generated and trained.

21 Claims, 11 Drawing Sheets

(56) References Cited

OTHER PUBLICATIONS

Novo et al., Flow-Based Detection and Proxy-Based Evasion of Encrypted Malware C2 Traffic, AISec '20, Nov. 13, 2020, Virtual Event, USA, pp. 83-91.
Rigaki et al., Bringing a GAN to a Knife-Fight: Adapting Malware Communication to Avoid Detection, 2018 IEEE Symposium on Security and Privacy Workshops, pp. 70-75.

* cited by examiner

[TCP]192.168.180.117:49158 -> 172.67.165.188:80 [236bytes]

POST /cd/ui/fo.php HTTP/1.0
User-Agent: Mozilla/4.08 (Charon; Inferno)
Host: zascocs.xyz
Accept: */*
Content-Type: application/octet-stream
Content-Encoding: binary
Content-Key: E2A55A90
Content-Length: 210
Connection: close

FIG. 5A

[TCP]192.168.180.117:49160 -> 172.67.165.188:80 [236bytes]

POST /cd/ui/fo.php HTTP/1.0
User-Agent: Mozilla/4.08 (Charon; Inferno)
Host: zascocs.xyz
Accept: */*
Content-Type: application/octet-stream
Content-Encoding: binary
Content-Key: E2A55A90
Content-Length: 183
Connection: close

FIG. 5B

```
<and>
 <entry>
      <pattern-match>
          <context>http-req-uri-path </context>
          <pattern>POST/cd/ui/fo\.php
HTTP</pattern>
      </pattern-match>
   </entry>
   <entry>
        <pattern-match>
             <context>http-req-headers</context>
             <pattern>illa/4\.08\(Charon;
Inferno\)\r\n\</pattern>
     </pattern-match>
  </entry>
</and>
```

FIG. 5C

SAMPLE TRAFFIC BASED SELF-LEARNING MALWARE DETECTION

BACKGROUND OF THE INVENTION

Malware is a general term commonly used to refer to malicious software (e.g., including a variety of hostile, intrusive, and/or otherwise unwanted software). Malware can be in the form of code, scripts, active content, and/or other software. Example uses of malware include disrupting computer and/or network operations, stealing proprietary information (e.g., confidential information, such as identity, financial, and/or intellectual property related information), and/or gaining access to private/proprietary computer systems and/or computer networks. Unfortunately, as techniques are developed to help detect and mitigate malware, nefarious authors find ways to circumvent such efforts. Accordingly, there is an ongoing need for improvements to techniques for identifying and mitigating malware.

BRIEF DESCRIPTION OF THE DRAWINGS

Various embodiments of the invention are disclosed in the following detailed description and the accompanying drawings.

FIGS. 5A and 5B illustrate example pcaps of a malware sample that can be detected using the C2 ML model in accordance with some embodiments.

FIG. 5C illustrates an example of an automatically generated IPS signature in accordance with some embodiments.

DETAILED DESCRIPTION

Figure 1:
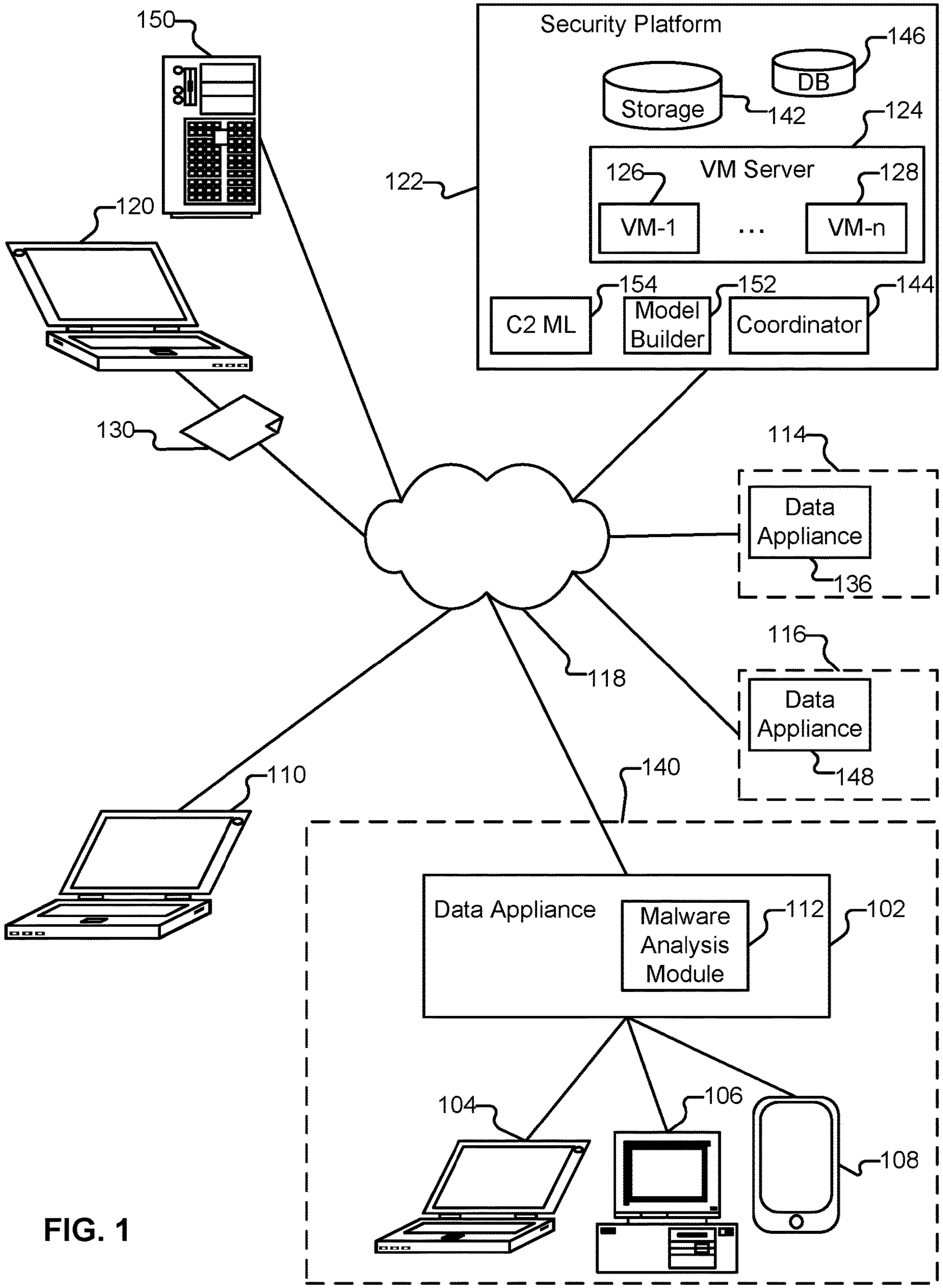
FIG. 1 illustrates an example of an environment in which malicious applications ("malware") are detected and prevented from causing harm.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A firewall generally protects networks from unauthorized access while permitting authorized communications to pass through the firewall. A firewall is typically a device, a set of devices, or software executed on a device that provides a firewall function for network access. For example, a firewall can be integrated into operating systems of devices (e.g., computers, smart phones, or other types of network communication capable devices). A firewall can also be integrated into or executed as one or more software applications on various types of devices, such as computer servers, gateways, network/routing devices (e.g., network routers), and data appliances (e.g., security appliances or other types of special purpose devices), and in various implementations, certain operations can be implemented in special purpose hardware, such as an ASIC or FPGA.

Firewalls typically deny or permit network transmission based on a set of rules. These sets of rules are often referred to as policies (e.g., network policies or network security policies). For example, a firewall can filter inbound traffic by applying a set of rules or policies to prevent unwanted outside traffic from reaching protected devices. A firewall can also filter outbound traffic by applying a set of rules or policies (e.g., allow, block, monitor, notify or log, and/or other actions can be specified in firewall rules or firewall policies, which can be triggered based on various criteria, such as are described herein). A firewall can also filter local network (e.g., intranet) traffic by similarly applying a set of rules or policies.

Security devices (e.g., security appliances, security gateways, security services, and/or other security devices) can include various security functions (e.g., firewall, anti-malware, intrusion prevention/detection, Data Loss Prevention (DLP), and/or other security functions), networking functions (e.g., routing, Quality of Service (QoS), workload balancing of network related resources, and/or other networking functions), and/or other functions. For example, routing functions can be based on source information (e.g., IP address and port), destination information (e.g., IP address and port), and protocol information.

A basic packet filtering firewall filters network communication traffic by inspecting individual packets transmitted over a network (e.g., packet filtering firewalls or first generation firewalls, which are stateless packet filtering firewalls). Stateless packet filtering firewalls typically inspect the individual packets themselves and apply rules based on the inspected packets (e.g., using a combination of a packet's source and destination address information, protocol information, and a port number).

Application firewalls can also perform application layer filtering (e.g., application layer filtering firewalls or second generation firewalls, which work on the application level of the TCP/IP stack). Application layer filtering firewalls or application firewalls can generally identify certain applications and protocols (e.g., web browsing using HyperText Transfer Protocol (HTTP), a Domain Name System (DNS) request, a file transfer using File Transfer Protocol (FTP), and various other types of applications and other protocols, such as Telnet, DHCP, TCP, UDP, and TFTP (GSS)). For example, application firewalls can block unauthorized protocols that attempt to communicate over a standard port (e.g., an unauthorized/out of policy protocol attempting to sneak through by using a non-standard port for that protocol can generally be identified using application firewalls).

Stateful firewalls can also perform state-based packet inspection in which each packet is examined within the context of a series of packets associated with that network transmission's flow of packets. This firewall technique is generally referred to as a stateful packet inspection as it maintains records of all connections passing through the firewall and is able to determine whether a packet is the start of a new connection, a part of an existing connection, or is an invalid packet. For example, the state of a connection can itself be one of the criteria that triggers a rule within a policy.

Advanced or next generation firewalls can perform stateless and stateful packet filtering and application layer filtering as discussed above. Next generation firewalls can also perform additional firewall techniques. For example, certain newer firewalls sometimes referred to as advanced or next generation firewalls can also identify users and content (e.g., next generation firewalls). In particular, certain next generation firewalls are expanding the list of applications that these firewalls can automatically identify to thousands of applications. Examples of such next generation firewalls are commercially available from Palo Alto Networks, Inc. (e.g., Palo Alto Networks' PA Series firewalls). For example, Palo Alto Networks' next generation firewalls enable enterprises to identify and control applications, users, and content not just ports, IP addresses, and packets using various identification technologies, such as the following: APP-ID for accurate application identification, User-ID for user identification (e.g., by user or user group), and Content-ID for real-time content scanning (e.g., controlling web surfing and limiting data and file transfers). These identification technologies allow enterprises to securely enable application usage using business-relevant concepts, instead of following the traditional approach offered by traditional port-blocking firewalls. Also, special purpose hardware for next generation firewalls (implemented, for example, as dedicated appliances) generally provide higher performance levels for application inspection than software executed on general purpose hardware (e.g., such as security appliances provided by Palo Alto Networks, Inc., which use dedicated, function specific processing that is tightly integrated with a single-pass software engine to maximize network throughput while minimizing latency).

Advanced or next generation firewalls can also be implemented using virtualized firewalls. Examples of such next generation firewalls are commercially available from Palo Alto Networks, Inc. (e.g., Palo Alto Networks' VM Series firewalls, which support various commercial virtualized environments, including, for example, VMware® ESXi™ and NSX™, Citrix® Netscaler SDX™, KVM/OpenStack (Centos/RHEL, Ubuntu®), and Amazon Web Services (AWS)) as well as CN Series container next generation firewalls. For example, virtualized firewalls can support similar or the exact same next-generation firewall and advanced threat prevention features available in physical form factor appliances, allowing enterprises to safely enable applications flowing into, and across their private, public, and hybrid cloud computing environments. Automation features such as VM monitoring, dynamic address groups, and a REST-based API allow enterprises to proactively monitor VM changes dynamically feeding that context into security policies, thereby eliminating the policy lag that may occur when VMs change.

Overview of Techniques for Sample Traffic Based Self-Learning Malware Detection

Existing anti-malware security solutions fail to efficiently and effectively detect new malware or new malware variants based on, for example, monitored process behavior, register behavior, file behavior, network traffic activity, etc. Specifically, existing anti-malware security solutions generally use emulation/sandbox implementations that have certain technical limitations, such as only performing emulation/sandbox analysis for a predetermined period of time (e.g., 1 to 5 minutes), allow-list filters, and/or other limitations, which, as a result, fail to detect new malware or new malware variants. These shortcomings associated with existing emulation/sandbox analysis solutions expose enterprises to significant security risks due to the failure to detect such new malware or new malware variants.

Thus, what are needed are anti-malware security solutions that can efficiently and effectively detect new malware or new malware variants.

Accordingly, new and improved techniques for sample traffic based self-learning malware detection are disclosed.

A new malware detection solution is disclosed that includes advanced machine learning (ML) to detect command-and-control (C2 or C&C) traffic (e.g., a type of malicious network communication between a C2 server and malware on an infected host) generated by a sample that is executed and monitored in an anti-malware emulation/sandbox of the new malware detection solution. The new malware detection solution can determine a verdict of the sample as malware using ML to facilitate detection of new malware or new malware variants based on the monitored network traffic activity.

Specifically, a new malware detection solution is disclosed that includes a detection system (e.g., including an Intrusion Prevention System (IPS)) and a self-learning ML-based feedback system. The detection system can facilitate detection of more samples as malware to improve existing sandbox solutions that would generate false negatives. The self-learning ML-based feedback system can enhance the detection system to facilitate detection of new malware or new malware variants based on monitored network traffic activity associated with a sample executed in the emulation/sandbox environment.

For example, the disclosed techniques for sample traffic based self-learning malware detection can improve the malware detection rate by approximately 20% over existing approaches for samples that generate C2 traffic during emulation/sandbox analysis. In an example implementation, the disclosed techniques for sample traffic based self-learning malware detection include an automatic self-learning system that leverages the signature and ML mode (e.g., of the self-learning ML-based feedback system) to improve malware detection capabilities over time, which can be implemented as, for example, an IPS component (e.g., plugin) to an emulation/sandbox of a cloud-based security solution that can detect the malicious C2 traffic associated with executed samples.

In some embodiments, a system/process/computer program product for sample traffic based self-learning malware detection includes receiving a plurality of samples for malware detection analysis using a sandbox; executing each of the plurality of samples in the sandbox and monitor network traffic during execution of each of the plurality of samples in the sandbox; detecting that one or more of the plurality of samples is malware based on automated analysis of the monitored network traffic (e.g., HyperText Transfer Protocol (HTTP) traffic, Internet Relay Chat (IRC) traffic, Transmission Control Protocol (TCP), User Datagram Protocol (UDP) traffic, and/or other/unknown network traffic) using a command and control (C2) machine learning (ML) model if there is not a prior match with an intrusion prevention system (IPS) signature; and performing an action in response to detecting that one or more of the plurality of samples is malware based on automated analysis of the monitored network traffic using the C2 ML model.

For example, detecting that one or more of the plurality of samples is malware based on automated analysis of the monitored network traffic using the C2 ML model can be implemented by performing an initial attempt to match a preexisting IPS signature prior to performing the automated analysis of the monitored network traffic using the C2 ML model.

In some embodiments, a system/process/computer program product for sample traffic based self-learning malware detection further includes detecting a previously unknown malware is performed using a security platform of a cloud service, wherein the security platform of the cloud service performs the detecting that one or more of the plurality of samples is malware based on automated analysis of the monitored network traffic using the C2 ML model.

In some embodiments, a system/process/computer program product for sample traffic based self-learning malware detection further includes automatically generating a new IPS signature in response to detecting a previously unknown malware is performed using a security platform of a cloud service, wherein the security platform of the cloud service performs the detecting that one or more of the plurality of samples is malware based on automated analysis of the monitored network traffic using the C2 ML model.

In some embodiments, a system/process/computer program product for sample traffic based self-learning malware detection further includes periodically updating the C2 ML model.

Accordingly, new and improved security solutions that facilitate sample traffic based self-learning malware detection using a security platform (e.g., a firewall (FW)/Next Generation Firewall (NGFW), a network sensor acting on behalf of the firewall, or another (virtual) device/component that can implement security policies using the disclosed techniques, including, for example, Palo Alto Networks' PA Series next generation firewalls, Palo Alto Networks' VM Series virtualized next generation firewalls, and CN Series container next generation firewalls, and/or other commercially available virtual-based or container-based firewalls can similarly be implemented and configured to perform the disclosed techniques) are disclosed in accordance with some embodiments.

These and other embodiments and examples for sample traffic based self-learning malware detection will be further described below.

Example System Architectures for Sample Traffic Based Self-Learning Malware Detection Accordingly, in some embodiments, the disclosed techniques include providing a security platform (e.g., the security function(s)/platform(s) can be implemented using a firewall (FW)/Next Generation Firewall (NGFW), a network sensor acting on behalf of the firewall, or another (virtual) device/component that can implement security policies using the disclosed techniques, such as PANGS executing on a virtual/physical NGFW solution commercially available from Palo Alto Networks, Inc. or another security platform/NFGW, including, for example, Palo Alto Networks' PA Series next generation firewalls, Palo Alto Networks' VM Series virtualized next generation firewalls, and CN Series container next generation firewalls, and/or other commercially available virtual-based or container-based firewalls can similarly be implemented and configured to perform the disclosed techniques) configured to provide DPI capabilities (e.g., including stateful inspection) of, for example, applying the disclosed techniques for automatically detecting new/variants of malware, such as C2 malware, as further described below.

FIG. 1 illustrates an example of an environment in which malicious applications ("malware") are detected and prevented from causing harm. As will be described in more detail below, malware classifications (e.g., as made by security platform 122) can be variously shared and/or refined among various entities included in the environment shown in FIG. 1. And, using techniques described herein, devices, such as endpoint client devices 104-110, can be protected from such malware (e.g., including previously unknown/new variants of malware, such as C2 malware).

"Malware" as used herein refers to an application that engages in behaviors, whether clandestinely or not (and whether illegal or not), of which a user does not approve/would not approve if fully informed. Examples of malware include ransomware, Trojans, viruses, rootkits, spyware, hacking tools, etc. One example of malware is a desktop/mobile application that encrypts a user's stored data (e.g., ransomware). Another example of malware is C2 malware, such as similarly described above. Other forms of malware (e.g., keyloggers) can also be detected/thwarted using the disclosed techniques for sample traffic based self-learning malware detection as will be further described herein.

Techniques described herein can be used in conjunction with a variety of platforms (e.g., servers, computing appliances, virtual/container environments, desktops, mobile devices, gaming platforms, embedded systems, etc.) and/or for automated detection of a variety of forms of malware (e.g., new and/or variants of malware, such as C2 malware, etc.). In the example environment shown in FIG. 1, client devices 104-108 are a laptop computer, a desktop computer, and a tablet (respectively) present in an enterprise network 140. Client device 110 is a laptop computer present outside of enterprise network 140.

Data appliance 102 is configured to enforce policies regarding communications between client devices, such as client devices 104 and 106, and nodes outside of enterprise network 140 (e.g., reachable via external network 118). Examples of such policies include ones governing traffic shaping, quality of service, and routing of traffic. Other examples of policies include security policies such as ones requiring the scanning for threats in incoming (and/or outgoing) email attachments, website content, files exchanged through instant messaging programs, and/or other file transfers. In some embodiments, data appliance 102 is also configured to enforce policies with respect to traffic that stays within enterprise network 140.

Figure 2A:
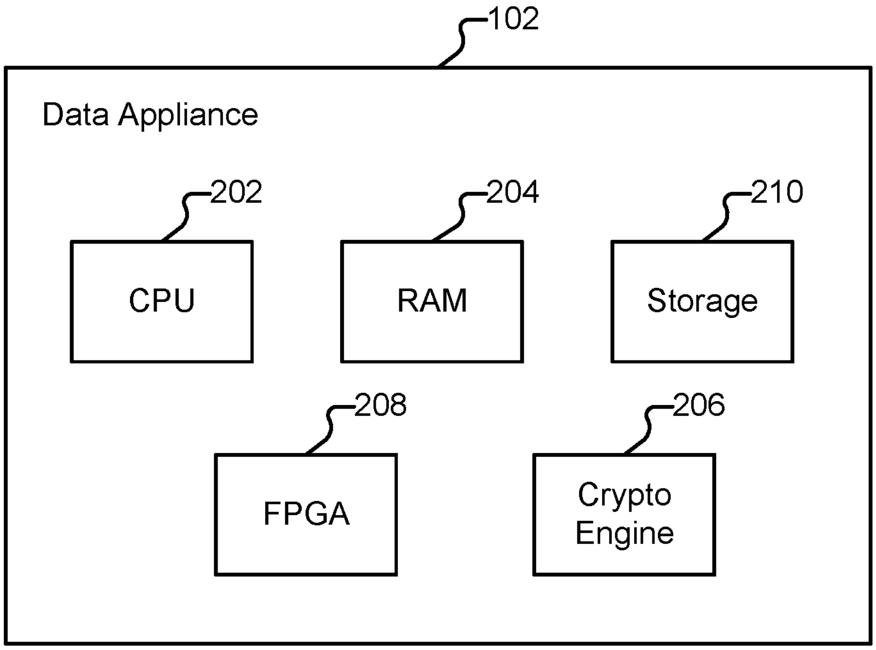
FIG. 2A is an embodiment of a data appliance.

An embodiment of a data appliance is shown in FIG. 2A. The example shown is a representation of physical components that are included in data appliance 102, in various embodiments. Specifically, data appliance 102 includes a high performance multi-core Central Processing Unit (CPU) 202 and Random Access Memory (RAM) 204. Data appliance 102 also includes a storage 210 (such as one or more hard disks or solid state storage units). In various embodiments, data appliance 102 stores (whether in RAM 204, storage 210, and/or other appropriate locations) information used in monitoring enterprise network 140 and implementing disclosed techniques. Examples of such information include application identifiers, content identifiers, user identifiers, requested URLs, IP address mappings, policy and other configuration information, signatures, hostname/URL categorization information, malware profiles, and machine learning (ML) models (e.g., such as for sample traffic based self-learning malware detection, include C2 ML models, as further described herein). Data appliance 102 can also include one or more optional hardware accelerators. For example, data appliance 102 can include a cryptographic engine 206 configured to perform encryption and decryption operations, and one or more Field Programmable Gate Arrays (FPGAs) 208 configured to perform matching, act as network processors, and/or perform other tasks.

Functionality described herein as being performed by data appliance 102 can be provided/implemented in a variety of ways. For example, data appliance 102 can be a dedicated device or set of devices. The functionality provided by data appliance 102 can also be integrated into or executed as software on a general purpose computer, a computer server, a gateway, and/or a network/routing device. In some embodiments, at least some services described as being provided by data appliance 102 are instead (or in addition) provided to a client device (e.g., client device 104 or client device 110) by software executing on the client device.

Whenever data appliance 102 is described as performing a task, a single component, a subset of components, or all components of data appliance 102 may cooperate to perform the task. Similarly, whenever a component of data appliance 102 is described as performing a task, a subcomponent may perform the task and/or the component may perform the task in conjunction with other components. In various embodiments, portions of data appliance 102 are provided by one or more third parties. Depending on factors such as the amount of computing resources available to data appliance 102, various logical components and/or features of data appliance 102 may be omitted and the techniques described herein adapted accordingly. Similarly, additional logical components/features can be included in embodiments of data appliance 102 as applicable. One example of a component included in data appliance 102 in various embodiments is an application identification engine which is configured to identify an application (e.g., using various application signatures for identifying applications based on packet flow analysis). For example, the application identification engine can determine what type of traffic a session involves, such as Web Browsing—Social Networking; Web Browsing—News; SSH; and so on.

Figure 2B:
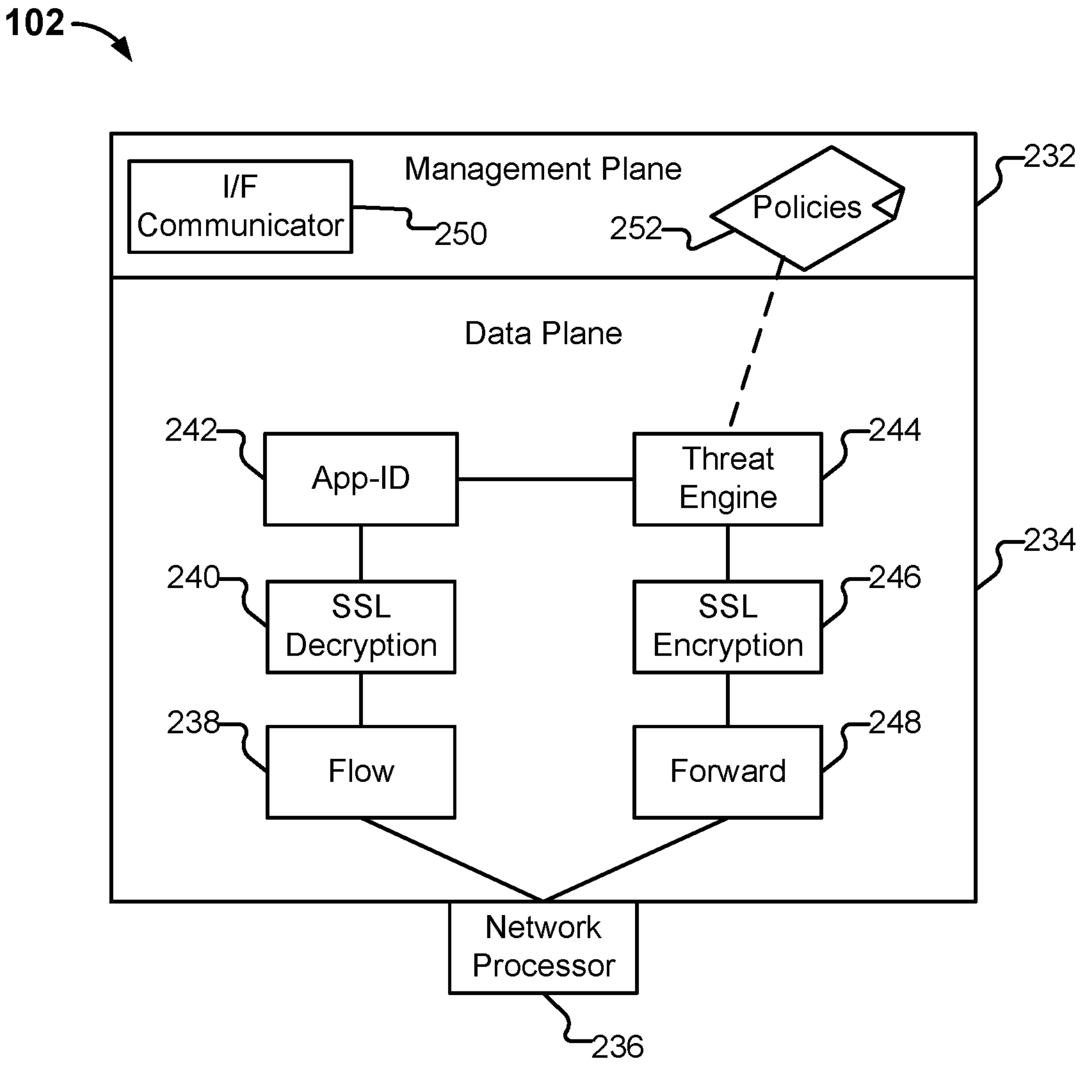
FIG. 2B is a functional diagram of logical components of an embodiment of a data appliance.

FIG. 2B is a functional diagram of logical components of an embodiment of a data appliance. The example shown is a representation of logical components that can be included in data appliance 102 in various embodiments. Unless otherwise specified, various logical components of data appliance 102 are generally implementable in a variety of ways, including as a set of one or more scripts (e.g., written in Java, python, etc., as applicable).

As shown, data appliance 102 comprises a firewall, and includes a management plane 232 and a data plane 234. The management plane is responsible for managing user interactions, such as by providing a user interface for configuring policies and viewing log data. The data plane is responsible for managing data, such as by performing packet processing and session handling.

Network processor 236 is configured to receive packets from client devices, such as client device 108, and provide them to data plane 234 for processing. Whenever flow module 238 identifies packets as being part of a new session, it creates a new session flow. Subsequent packets will be identified as belonging to the session based on a flow lookup. If applicable, SSL decryption is applied by SSL decryption engine 240. Otherwise, processing by SSL decryption engine 240 is omitted. Decryption engine 240 can help data appliance 102 inspect and control SSL/TLS and SSH encrypted traffic, and thus help to stop threats that might otherwise remain hidden in encrypted traffic. Decryption engine 240 can also help prevent sensitive content from leaving enterprise network 140. Decryption can be controlled (e.g., enabled or disabled) selectively based on parameters such as: URL category, traffic source, traffic destination, user, user group, and port. In addition to decryption policies (e.g., that specify which sessions to decrypt), decryption profiles can be assigned to control various options for sessions controlled by the policy. For example, the use of specific cipher suites and encryption protocol versions can be required.

Application identification (APP-ID) engine 242 is configured to determine what type of traffic a session involves. As one example, application identification engine 242 can recognize a GET request in received data and conclude that the session requires an HTTP decoder. In some cases, such as a web browsing session, the identified application can change, and such changes will be noted by data appliance 102. For example, a user may initially browse to a corporate Wild (classified based on the URL visited as "Web Browsing—Productivity") and then subsequently browse to a social networking site (classified based on the URL visited as "Web Browsing—Social Networking"). Distinct types of protocols have corresponding decoders.

Based on the determination made by application identification engine 242, the packets are sent, by threat engine 244, to an appropriate decoder configured to assemble packets (which may be received out of order) into the correct order, perform tokenization, and extract out information. Threat engine 244 also performs signature matching to determine what should happen to the packet. As needed, SSL encryption engine 246 can re-encrypt decrypted data. Packets are forwarded using a forward module 248 for transmission (e.g., to a destination).

As also shown in FIG. 2B, policies 252 are received and stored in management plane 232. Policies can include one or more rules, which can be specified using domain and/or host/server names, and rules can apply one or more signatures or other matching criteria or heuristics, such as for security policy enforcement for subscriber/IP flows based on various extracted parameters/information from monitored session traffic flows. Example policies can include C2 malware detection policies using the disclosed techniques for sample traffic based self-learning malware detection. An interface (I/F) communicator 250 is provided for management communications (e.g., via (REST) APIs, messages, or network protocol communications or other communication mechanisms).

Security Platform

Returning to FIG. 1, suppose a malicious individual (using system 120) has created malware 130, such as a new/variant C2 malware (e.g., the malware can be delivered to endpoint devices of users via a compromised web site when the user visits/browses to the compromised web site or via a phishing attack, etc.). The malicious individual hopes that a client device, such as client device 104, will execute a copy of malware 130 to unpack the malware executable/payload, compromising the client device, and, e.g., causing the client device to become a bot in a botnet. The compromised client device can then be instructed to perform tasks (e.g., cryptocurrency mining, or participating in denial of service attacks) and to report information to an external entity, such as command and control (C2/C&C) server 150, as well as to receive instructions from C2 server 150, as applicable.

Suppose data appliance 102 has intercepted an email sent (e.g., by system 120) to a user, "Alice," who operates client device 104. In this example, Alice receives the email and clicks on the link to a phishing/compromised site that could result in an attempted download of malware 130 by Alice's client device 104. However, in this example, data appliance 102 can perform the disclosed techniques for sample traffic based self-learning malware detection and block access from Alice's client device 104 to the packed malware content and to thereby preempt and prevent any such download of malware 130 to Alice's client device 104. As will be further described below, data appliance 102 performs the disclosed techniques for sample traffic based self-learning malware detection, such as further described below, to detect and block such malware 130 from harming Alice's client device 104.

In various embodiments, data appliance 102 is configured to work in cooperation with security platform 122. As one example, security platform 122 can provide to data appliance 102 a set of signatures of known-malicious files (e.g., as part of a subscription). If a signature for malware 130 is included in the set (e.g., an MD5 hash of malware 130), data appliance 102 can prevent the transmission of malware 130 to client device 104 accordingly (e.g., by detecting that an MD5 hash of the email attachment sent to client device 104 matches the MD5 hash of malware 130). Security platform 122 can also provide to data appliance 102 a list of known malicious domains and/or IP addresses, allowing data appliance 102 to block traffic between enterprise network 140 and C2 server 150 (e.g., where C&C server 150 is known to be malicious). The list of malicious domains (and/or IP addresses) can also help data appliance 102 determine when one of its nodes has been compromised. For example, if client device 104 attempts to contact C2 server 150, such attempt is a strong indicator that client 104 has been compromised by malware (and remedial actions should be taken accordingly, such as quarantining client device 104 from communicating with other nodes within enterprise network 140).

As will be described in more detail below, security platform 122 can also receive a copy of malware 130 from data appliance 102 to perform cloud-based security analysis for performing sample traffic based self-learning malware detection, and the malware verdict can be sent back to data appliance 102 for enforcing the security policy to thereby safeguard Alice's client device 104 from execution of malware 130 (e.g., to block malware 130 from access on client device 104).

Further, security platform 122 can also provide other types of information to data appliance 102 (e.g., as part of a subscription) such as a set of information for performing the disclosed techniques for sample traffic based self-learning malware detection usable by data appliance 102 to perform inline analysis of such malware files as will be further described below.

A variety of actions can be taken by data appliance 102 if no signature for an attachment is found, in various embodiments. As a first example, data appliance 102 can fail-safe, by blocking transmission of any attachments not whitelisted as benign (e.g., not matching signatures of known good files). A drawback of this approach is that there may be many legitimate attachments unnecessarily blocked as potential malware when they are in fact benign. As a second example, data appliance 102 can fail-danger, by allowing transmission of any attachments not blacklisted as malicious (e.g., not matching signatures of known bad files). A drawback of this approach is that newly created malware (previously unseen by platform 122) will not be prevented from causing harm. As a third example, data appliance 102 can be configured to provide the file (e.g., malware 130) to security platform 122 for static/dynamic analysis, to determine whether it is malicious and/or to otherwise classify it.

Security platform 122 stores copies of received samples in storage 142 and analysis is commenced (or scheduled, as applicable). One example of storage 142 is an Apache Hadoop Cluster (RDFS). Results of analysis (and additional information pertaining to the applications) are stored in database 146. In the event an application is determined to be malicious, data appliances can be configured to automatically block the file download based on the analysis result. Further, a signature can be generated for the malware and distributed (e.g., to data appliances such as data appliances 102, 136, and 148) to automatically block future file transfer requests to download the file determined to be malicious.

In various embodiments, security platform 122 comprises one or more dedicated commercially available hardware servers (e.g., having multi-core processor(s), 32G+ of RAM, gigabit network interface adaptor(s), and hard drive(s)) running typical server-class operating systems (e.g., Linux). Security platform 122 can be implemented across a scalable infrastructure comprising multiple such servers, solid state drives, and/or other applicable high-performance hardware. Security platform 122 can comprise several distributed components, including components provided by one or more third parties. For example, portions or all of security platform 122 can be implemented using the Amazon Elastic Compute Cloud (EC2) and/or Amazon Simple Storage Service (S3). Further, as with data appliance 102, whenever security platform 122 is referred to as performing a task, such as storing data or processing data, it is to be understood that a sub-component or multiple sub-components of security platform 122 (whether individually or in cooperation with third party components) may cooperate to perform that task. As one example, security platform 122 can optionally perform static/dynamic analysis in cooperation with one or more virtual machine (VM) servers, such as VM server 124.

An example of a virtual machine server is a physical machine comprising commercially available server-class hardware (e.g., a multi-core processor, 32+ Gigabytes of RAM, and one or more Gigabit network interface adapters) that runs commercially available virtualization software, such as VMware ESXi, Citrix XenServer, or Microsoft Hyper-V. In some embodiments, the virtual machine server is omitted. Further, a virtual machine server may be under the control of the same entity that administers security platform 122, but may also be provided by a third party. As one example, the virtual machine server can rely on EC2, with the remainder portions of security platform 122 provided by dedicated hardware owned by and under the control of the operator of security platform 122. VM server 124 is configured to provide one or more virtual machines 126-128 for emulating client devices. The virtual machines can execute a variety of operating systems and/or versions thereof. Observed behaviors resulting from executing applications in the virtual machines are logged and analyzed (e.g., for indications that the application is malicious). In some embodiments, log analysis is performed by the VM server (e.g., VM server 124). In other embodiments, analysis is performed at least in part by other components of security platform 122, such as a coordinator 144.

In various embodiments, security platform 122 makes available results of its analysis of samples via a list of signatures (and/or other identifiers) to data appliance 102 as part of a subscription. For example, security platform 122 can periodically send a content package that identifies malware files, including for sample traffic based self-learning malware detection, etc. (e.g., daily, hourly, or some other interval, and/or based on an event configured by one or more policies). An example content package includes a C2 ML detector 154 and/or other information (e.g., ML-based detection models), such as further described below. The subscription can cover the analysis of just those files intercepted by data appliance 102 and sent to security platform 122 by data appliance 102, and can also cover signatures of malware known to security platform 122. As will be described in more detail below, platform 122 can also utilize other types of information/ML models for performing sample traffic based self-learning malware detection. Specifically, platform 122 can utilize ML models generated using model builder 152 including C2 ML detector 154 (e.g., C2 ML model(s) that can be implemented as a plugin or sub-component of platform 122, such as will be further described below, such as with respect to FIGS. 4A and 4B), which can help data appliance 102 detect and perform inline blocking of potentially new/variant C2 malware.

In various embodiments, security platform 122 is configured to provide security services to a variety of entities in addition to (or, as applicable, instead of) an operator of data appliance 102. For example, other enterprises, having their own respective enterprise networks 114 and 116, and their own respective data appliances 136 and 148, can contract with the operator of security platform 122. Other types of entities can also make use of the services of security platform 122. For example, an Internet Service Provider (ISP) providing Internet service to client device 110 can contract with security platform 122 to analyze applications which client device 110 attempts to download. As another example, the owner of client device 110 can install software on client device 110 that communicates with security platform 122 (e.g., to receive content packages from security platform 122, use the received content packages to check attachments in accordance with techniques described herein, and transmit applications to security platform 122 for analysis).

Analyzing Samples Using Static/Dynamic Analysis

Figure 3:
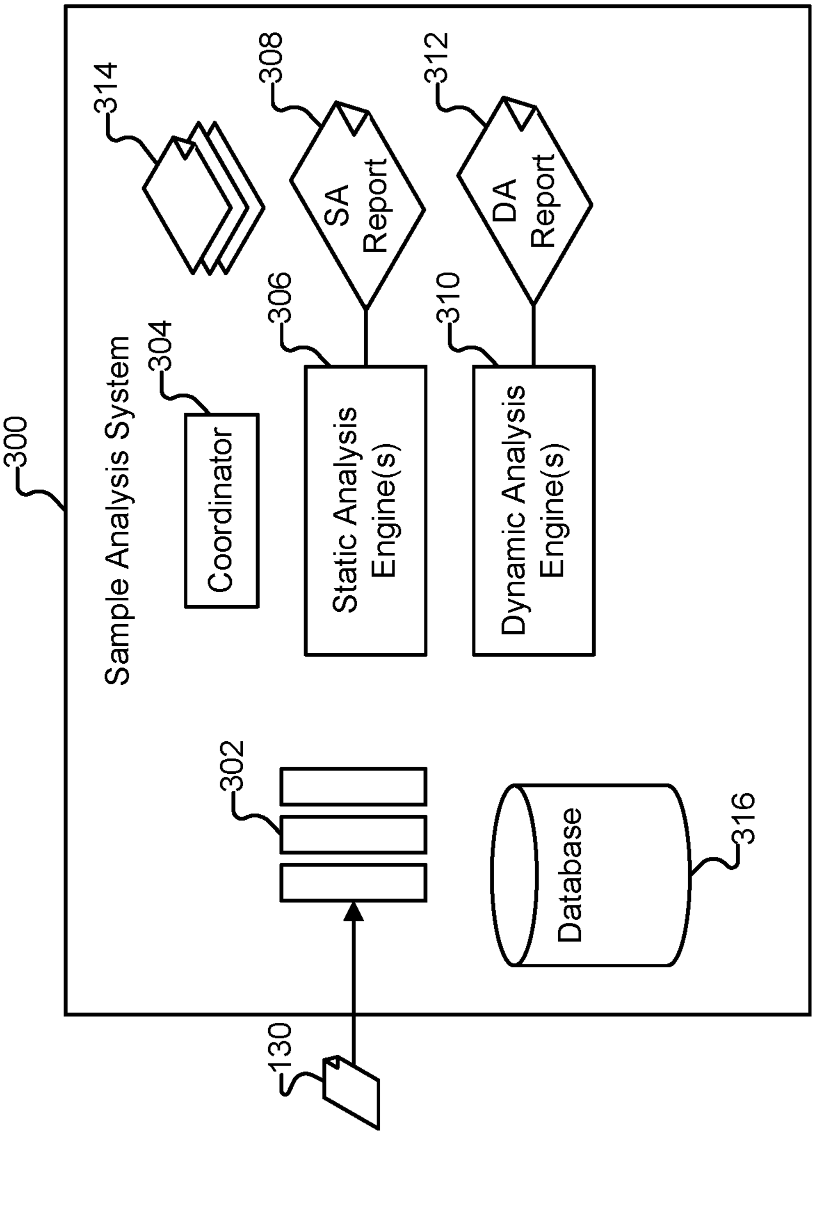
FIG. 3 illustrates an example of logical components that can be included in a system for analyzing samples.

FIG. 3 illustrates an example of logical components that can be included in a system for analyzing samples. Analysis system 300 can be implemented using a single device. For example, the functionality of analysis system 300 can be implemented in a malware analysis module 112 incorporated into data appliance 102. Analysis system 300 can also be implemented, collectively, across multiple distinct devices. For example, the functionality of analysis system 300 can be provided by security platform 122.

In various embodiments, analysis system 300 makes use of lists, databases, or other collections of known safe content and/or known bad content (collectively shown in FIG. 3 as collection 314). Collection 314 can be obtained in a variety of ways, including via a subscription service (e.g., provided by a third party) and/or as a result of other processing (e.g., performed by data appliance 102 and/or security platform 122). Examples of information included in collection 314 are: URLs, domain names, and/or IP addresses of known malicious servers; URLs, domain names, and/or IP addresses of known safe servers; URLs, domain names, and/or IP addresses of known command and control (C2/C&C) domains; signatures, hashes, and/or other identifiers of known malicious applications; signatures, hashes, and/or other identifiers of known safe applications; signatures, hashes, and/or other identifiers of known malicious files (e.g., OS exploit files); signatures, hashes, and/or other identifiers of known safe libraries; and signatures, hashes, and/or other identifiers of known malicious libraries.

In various embodiments, when a new sample is received for analysis (e.g., an existing signature associated with the sample is not present in analysis system 300), it is added to queue 302. As shown in FIG. 3, application 130 is received by system 300 and added to queue 302.

Coordinator 304 monitors queue 302, and as resources (e.g., a static analysis worker) become available, coordinator 304 fetches a sample from queue 302 for processing (e.g., fetches a copy of malware 130). In particular, coordinator 304 first provides the sample to static analysis engine 306 for static analysis. In some embodiments, one or more static analysis engines are included within analysis system 300, where analysis system 300 is a single device. In other embodiments, static analysis is performed by a separate static analysis server that includes a plurality of workers (i.e., a plurality of instances of static analysis engine 306).

The static analysis engine obtains general information about the sample, and includes it (along with heuristic and other information, as applicable) in a static analysis report 308. The report can be created by the static analysis engine, or by coordinator 304 (or by another appropriate component) which can be configured to receive the information from static analysis engine 306. As an example, static analysis of malware can include performing a signature-based analysis. In some embodiments, the collected information is stored in a database record for the sample (e.g., in database 316), instead of or in addition to a separate static analysis report 308 being created (i.e., portions of the database record form the report 308). In some embodiments, the static analysis engine also forms a verdict with respect to the application (e.g., "safe," "suspicious," or "malicious"). As one example, the verdict can be "malicious" if even one "malicious" static feature is present in the application (e.g., the application includes a hard link to a known malicious domain). As another example, points can be assigned to each of the features (e.g., based on severity if found; based on how reliable the feature is for predicting malice; etc.) and a verdict can be assigned by static analysis engine 306 (or coordinator 304, if applicable) based on the number of points associated with the static analysis results.

Once static analysis is completed, coordinator 304 locates an available dynamic analysis engine 310 to perform dynamic analysis on the application. As with static analysis engine 306, analysis system 300 can include one or more dynamic analysis engines directly. In other embodiments, dynamic analysis is performed by a separate dynamic analysis server that includes a plurality of workers (i.e., a plurality of instances of dynamic analysis engine 310).

Each dynamic analysis worker manages a virtual machine instance (e.g., emulation/sandbox analysis of samples for malware detection, such as the above-described C2 malware detection based on monitored network traffic activity). In some embodiments, results of static analysis (e.g., performed by static analysis engine 306), whether in report form (308) and/or as stored in database 316, or otherwise stored, are provided as input to dynamic analysis engine 310. For example, the static report information can be used to help select/customize the virtual machine instance used by dynamic analysis engine 310 (e.g., Microsoft Windows 7 SP 2 vs. Microsoft Windows 10 Enterprise, or iOS 11.0 vs. iOS 12.0). Where multiple virtual machine instances are executed at the same time, a single dynamic analysis engine can manage all of the instances, or multiple dynamic analysis engines can be used (e.g., with each managing its own virtual machine instance), as applicable. As will be explained in more detail below, during the dynamic portion of the analysis, actions taken by the application (including network activity) are analyzed.

In various embodiments, static analysis of a sample is omitted or is performed by a separate entity, as applicable. As one example, traditional static and/or dynamic analysis may be performed on files by a first entity. Once it is determined (e.g., by the first entity) that a given file is malicious, the file can be provided to a second entity (e.g., the operator of security platform 122) specifically for additional analysis with respect to the malware's use of network activity (e.g., by a dynamic analysis engine 310).

The environment used by analysis system 300 is instrumented/hooked such that behaviors observed while the application is executing are logged as they occur (e.g., using a customized kernel that supports hooking and logcat). Network traffic associated with the emulator is also captured (e.g., using pcap). The log/network data can be stored as a temporary file on analysis system 300, and can also be stored more permanently (e.g., using HDFS or another appropriate storage technology or combinations of technology, such as MongoDB). The dynamic analysis engine (or another appropriate component) can compare the connections made by the sample to lists of domains, IP addresses, etc. (314) and determine whether the sample has communicated (or attempted to communicate) with malicious entities.

As with the static analysis engine, the dynamic analysis engine stores the results of its analysis in database 316 in the record associated with the application being tested (and/or includes the results in report 312 as applicable). In some embodiments, the dynamic analysis engine also forms a verdict with respect to the application (e.g., "safe," "suspicious," or "malicious"). As one example, the verdict can be "malicious" if even one "malicious" action is taken by the application (e.g., an attempt to contact a known malicious domain is made, or an attempt to exfiltrate sensitive information is observed). As another example, points can be assigned to actions taken (e.g., based on severity if found; based on how reliable the action is for predicting malice; etc.) and a verdict can be assigned by dynamic analysis engine 310 (or coordinator 304, if applicable) based on the number of points associated with the dynamic analysis results. In some embodiments, a final verdict associated with the sample is made based on a combination of report 308 and report 312 (e.g., by coordinator 304).

Sample Traffic Based Self-Learning Malware Detection

Figure 4A:
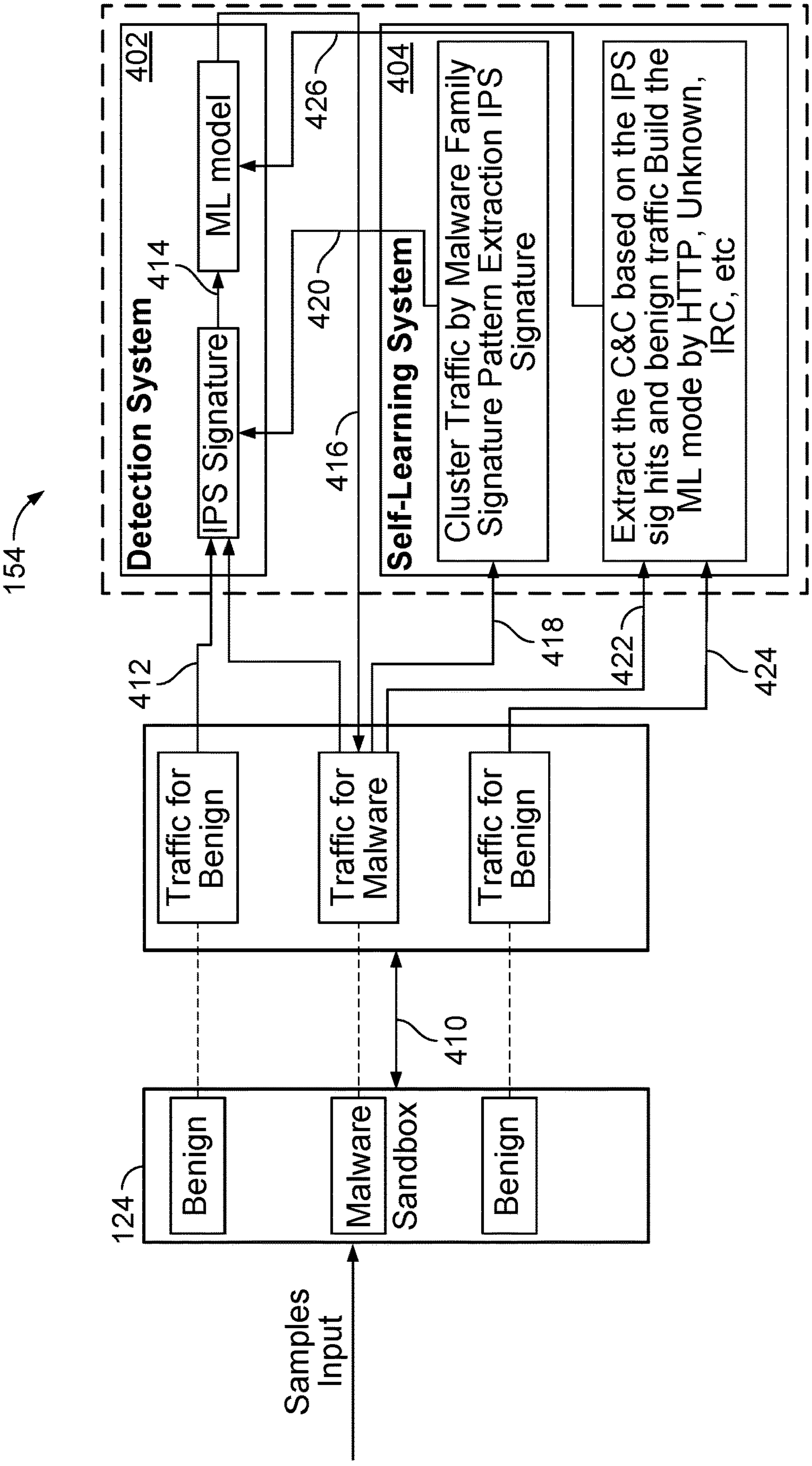
FIG. 4A illustrates portions of an example embodiment of a detection system and a self-learning system for processing of sample traffic for performing malware detection in accordance with some embodiments.

FIG. 4A illustrates portions of an example embodiment of a detection system and a self-learning system for processing of sample traffic for performing malware detection in accordance with some embodiments. As similarly discussed above, in various embodiments, security platform 122 includes a C2 ML detector 154. FIG. 4A illustrates subcomponents of C2 ML detector 154 including the following sub-components: a detection system 402 and a self-learning system 404.

The disclosed sample traffic based self-learning malware detection solution to assist and enhance malware detection rate for samples executed in an emulation/sandbox includes sandbox 124 (e.g., as similarly described above, implemented using a VM server 124 that is configured to provide one or more virtual machines 126-128 for emulating client devices for executing potentially benign or malware samples), detection system 402, and self-learning system 404. Detection system 402 uses an IPS signature-based detection component as well as a C2 ML model generated using self-learning system 404 to improve false negative detection results from sandbox 124.

Referring to FIG. 4A, an example workflow begins with samples input to sandbox 124. The samples are executed and a network associated with the executed samples (e.g., benign and malware samples as illustrated in FIG. 4A) is monitored using the instrumented sandbox (124) as shown at 410. The IPS signature-based detection component of detection system 402 receives the network traffic associated with the executed samples (e.g., packet capture (pcap) data associated with a given sample) as shown at 412. Specifically, the IPS signature-based detection component checks whether the traffic includes malicious information or other malicious related attributes to attempt to determine whether the sample is malicious or benign solely on existing IPS signatures. If a given sample can be determined to be malicious based on the IPS signature-based detection component, then the analysis is completed at this stage for that given sample. However, if it is not determined to be malicious based on the IPS signature-based detection component, then the analysis proceeds to analysis of the sample traffic using the C2 ML model of detection system 402 as shown at 414. The C2 ML model attempts to determine whether the sample is malicious or benign based on the sample traffic detected during emulation in the sandbox. Benign or malicious verdicts are communicated back to the sandbox as shown at 416 (e.g., a malicious verdict of the sample having generated session traffic that is associated with C2 traffic).

In this example implementation, self-learning system 404 is responsible for generating and updating the C2 ML model based on the detection system's results as well as the IPS signature based on the C2 ML detection results to facilitate detection of new C2 malware and/or new variants of previously identified C2 malware (e.g., a new member of a C2 malware family). Specifically, traffic for malicious samples is provided to self-learning system 404 for further processing as shown at 418. The malware sample can be clustered, such as based on the malware family name (e.g., to identify if the new/variant malware sample is associated with/a member of an existing C2 malware family). As shown at 420, a signature pattern is extracted from the network traffic associated with the malware sample (e.g., extracted from network traffic session information and payload to determine and automatically extract a pattern(s) from the network traffic that are common to that malware family) to generate a new IPS signature for the new/variant malware that is sent to the IPS signature sub-component of detection system 402.

In this example implementation, self-learning system 404 is also responsible for generating and updating the training for the C2 ML model based on the detection system's results for detected malicious and benign network traffic. Referring to 422 and 424, self-learning system 404 extracts the C2 traffic based on the IPS signature hits and benign traffic from prior malware analysis results. The C2 ML model is generated/training is periodically updated based on various network traffic sessions (e.g., for HTTP traffic sessions, Unknown traffic sessions, IRC traffic sessions, and/or other types of network protocols). The generated/updated C2 ML model is provided to detection system 402 as shown at 426.

Deep Learning Model for Detecting Malicious Command and Control (C2) Traffic

In an example implementation, the C2 ML model is implemented using a One Class Support Vector Machine (OC-SVM). The SVM implemented ML model for C2 traffic detection is trained using feature pattern extractions for malware samples with C2 traffic. A feature vector generator can be used to generate a feature vector from the training set of sample data to train an anomaly detector OC-SVM. For C2 HTTP traffic detection using the anomaly detector OC-SVM, various features can be used including, for example, lexical features (e.g., length of the request header, number of special characters, DGA, etc.), host-based features (e.g., IP Address properties, WHOIS information, domain name properties, etc.), content features (e.g., bag of words, TF-IDF, etc.), etc. Request header information can be used to generate a vector representation by performing the following operations: find commonly used characters in request headers, tokenize at special characters to get words, generate a vocabulary index mapping (e.g., {'GET':1, '/':2, sobaka1':3, 'gif':4, '?':5, 'HTTP':6 . . . }), pad request header to make length of 600 characters, and compute embeddings matrix during training. The C2 ML model can then be generated as a BiDirectional Long Short-Term Memory (LSTM) deep learning model for automatically detecting C2 traffic. An example implementation of a deep learning model for detecting malicious C2 traffic will now be further described below.

As similarly described above, the system can perform automatic feature identification for malicious command and control (C2) traffic detection based on, for example, a request header (e.g., and/or other information/attributes associated with the monitored network traffic session) of the monitored network traffic session using a deep learning model. In some embodiments, the system extracts the request header from the network traffic session. In some embodiments, the request header relates to an HTTP request. In some embodiments, the request header is tokenized to generate character tokens and word tokens. Character tokens can be described as single letter words. The character tokens and word tokens can be "symbols" including letters and numbers, as defined, for example, in the ASCII table. In some embodiments, the tokenization includes tokenizing special characters to get words so that a word ends at a special character. In some embodiments, there is no requirement that any word end at a special character. In some embodiments, special characters are removed during the tokenization operation. Examples of special characters include "/", "\", "$", "#", ";", etc. In some embodiments, the character tokens and word tokens are filtered or cleaned up (e.g., words and/or characters that appear twice in the request header are removed).

In an example implementation for performing automatic feature identification, the system extracts a request header from a network traffic session. In some embodiments, the system pads the request header to be of a fixed length (e.g., the fixed length is 500 characters, 600 characters, 700 characters, etc.). In some embodiments, the system determines words from numbers using a vocabulary index map. The system then performs tokenization of the request header to generate character tokens and word tokens. In some embodiments, special characters of the request header are tokenized as word tokens. The system then feeds the character tokens and word tokens into an embedding layer of a deep learning model to find a group of features. In some embodiments, the deep learning model corresponds to a neural network. In some embodiments, the embedding layer is multiplied by a filter matrix to obtain a one-dimensional convolutional neural network (1D CNN). In some embodiments, after obtaining the 1D CNN, the elements of the 1D CNN are reduced by max-pooling the elements. In some embodiments, the max-pooled elements are fed into a bidirectional long short-term memory (Bi-LSTM) with attention to obtain a context relationship between the features. After the context relationship is obtained, the features having the highest context relationship score are determined to obtain the group of features. In some embodiments, the group of features are fed into a fully connected layer of a deep learning model, such as a neural network, and a result is obtained from the deep learning model.

In an example implementation for performing a process for feeding the character tokens and the word tokens into an embedding layer of the deep learning model to find a group of features, the system multiplies an embedding layer with a filter matrix to obtain a convolution layer. In some embodiments, the embedding layer is multiplied by a filter matrix to obtain a first element of a convolution layer, the filter matrix is then shifted one row downward to a different set of elements of the embedding layer to obtain a second element of the convolution layer, etc., so that all of the elements of the convolution layer are obtained. In some embodiments, the filter matrix is a k×Y matrix, where k is an integer less than the number of rows in the embedding layer (e.g., 2, 3, 4, 5, etc.) and Y is the number of columns in the filter matrix (e.g., 300, 400, etc.). In some embodiments, each element of the filter matrix is a randomly generated number. The system then max-pools a plurality of elements of the convolution layer to obtain a group of features. In some embodiments, the system obtains a maximum from a pool of elements. In some embodiments, the pool corresponds to a fixed number of elements of the convolution layer (e.g., 3, 5, 10, 15, etc.). In some embodiments, the system obtains a minimum from the pool of elements. In some embodiments, the system obtains a mean or an average from the pool of elements. In some embodiments, the max-pooling, the min-pooling, or the average-pooling is used to reduce the feature set. After the feature set is identified, a cost function is then determined.

In some embodiments, the request header is padded with characters so that the request header is a fixed length (e.g., 500 characters, 600 characters, etc.). In some embodiments, commonly used characters are located in the request header. In some embodiments, special characters in the request headers are used for tokenization. In some embodiments, numbers and words that appear more than once are cleaned up so that the duplicated numbers and words only appear once after tokenization. For example, the words of the first line of the request header example include GET, sobaka, gif, 12db3cf, 98861835, and HTTP.

In some embodiments, the tokens of the request header are converted into an integer encoding and fed into the embedding layer when they are used for performing detection of command and control malware within a firewall.

In some embodiments, an embedding layer is performed, in which the words extracted from a plurality of request headers are listed in a column. As an example, the number of words in the column can be 200, 500, 600, 700, etc. In some embodiments, the number of items in the column corresponds with all of the different words that have been extracted from the various request headers. Also, in the example, a number of elements in a row of the embedding layer is 300. In this example, the embedding layer is a 600×300 matrix. In some embodiments, the embedding layer is initialized so that each element of the embedding layer is a random number.

In some embodiments, a one-dimensional convolution is performed. In some embodiments, a filter matrix is composed of random elements with a number of elements in the column being k, where k is an integer of at least 1, and a number of elements in a row is N, where N is, for example, 300. For example, k is 2, 4, 5, 10, 11, etc. In some embodiments, the number of elements in the row of the filter matrix is the same as the number of elements in the row of the embedding layer. In the example, the size of the filter column is set to 5.$In some embodiments, the number of elements in the row is 100, 200, etc.

The embedding layer is multiplied by the filter matrix to output a first element of a one-dimensional (1D) convolution (e.g., elements of the embedding layer are multiplied with corresponding elements of the filter matrix and the products of the various multiplied elements are summed to obtain an element of the 1D convolution). Furthermore, the filter matrix is shifted one column to the right and the second element of the 1D convolution is computed. The shifting and computing can be repeated until the entire 1D convolution is obtained. Please note that the second element can be obtained before the first element, after the first element, or at the same time as the first element. In other words, the order in which the first element and the second element (or any of the elements of 1D convolution) are obtained does not matter. In some embodiments, the ID convolution is max-pooled to reduce the number of elements output. In this example, the six elements of the ID convolution are max-pooled to obtain that largest value of the group of six elements. As an aspect, two groups of three elements each can be used for max-pooling so that the result is two elements being the largest values of their respective groups. In the example, the max-pooled output is 0.8, which corresponds with the sobaka element.

In this example implementation of a model architecture with convolutions, the model architecture includes a plurality of request headers. After being tokenized, the plurality of request headers can form a set of embedding layers, which are multiplied by filter matrices having various widths to obtain a set of 1D convolutions. In some embodiments, the set of 1D convolutions are max-pooled to obtain a reduced set of elements.

In an example implementation for performing a process for a bidirectional long short-term memory with attention, the reduced set of elements is input into the bidirectional long short-term memory (LSTM) to identify two elements that are related to each other. In some embodiments, the LSTM has feedback connections so when each element goes through an LSTM cell, the LSTM cell computes scores based on the elements that it has seen before (front to back). In Bi-LSTM, these scores (first scores) can also be computed based on the elements that the LSTM cell would see later (back to front), the first scores can be stored in a cell state (a memory of the LSTM cell). The LSTM cell can also compute a score of an immediate element only and store the score (a second score) of the immediate element in a hidden state. Both these scores (the first scores and the second score) are multiplied to obtain a relationship score. After the reduced set of elements are input into the bidirectional LSTM, the bidirectional LSTM outputs a set of related elements where pairs of elements have a context relationship based on the relationship score. In some embodiments, the pairs of elements that are related to each other are used as input into a deep learning network.

In an example implementation for performing a process for generating a fully connected layer in a deep learning network, the set of related elements ($x_1, x_2, \ldots, x_m$) are input into the fully connected layer in the deep learning network, and the values of y and 1−y are output from the fully connected layer. As an example, the deep learning network is a neural network. In some embodiments, y represents the likelihood the sample is malicious and (1−y) represents the likelihood that the sample is benign. For example, y is 0.99 and 1−y is 0.01. In some embodiments, the fully connected layer learns how to classify the set of related elements. In this example, a y being closer to 1 means that the sample is more likely to be malicious, and a y being closer to 0 means that the sample is more likely to be benign. In this example, using a threshold of 0.99, the fully connected network indicates that the sample is malicious, and the truth found in the request header confirms that sample is malicious.

In some embodiments, the cost function corresponds with cross entropy which is trained through stochastic gradient descent and a back propagation algorithm. In some embodiments, $y_n$ corresponds to probabilities output from a deep learning network and $t_n$ represents truths of the sample. In some embodiments, to is a label for the request header, and the label can be malicious (1) or benign (0). Subsequently, the embedding layer and the filter matrix can be trained using the cost function. For example, the result of the cost function is multiplied with each element of the embedding layer to obtain a new embedding layer, and the result of the cost function is multiplied with each element of the filter matrix to obtain a new filter matrix, and the whole process is repeated using the new embedding layer and the new filter matrix. In some embodiments, during the training of the embedding layer and the filter matrix, the embedding layer and the filter matrix are updated multiple times to obtain an increased model accuracy and a reduced model loss.

After the model (which includes the embedding layer, CNN layer, the bidirectional LSTM layer, and the fully connected layer) has been trained, the model can be deployed to a cloud or on the firewall itself, so that the cloud or the firewall can perform real-time malicious command and control traffic detection using the model.

In an example implementation for training the model, the accuracy of the model is evaluated using a set of real-world test data or using a set of training data. For the set of training data, the accuracy of the model steadily increases until the accuracy is about 0.995 after each epoch or each iteration. Conversely, for the set of training data, the loss of the model steadily decreases until the loss reaches about 0.005 after each epoch or each iteration. For the set of real-world test data, the accuracy of the model steadily increases until the accuracy plateaus at about 0.98 after each epoch or each iteration. Conversely, for the set of training data, the loss of the model steadily decreases until the loss plateaus at about 0.02 after each epoch or each iteration.

The above-described example implementation provides a fully-automated system that can be applied to all types of sandboxes for malware (e.g., associated with C2 traffic) detection. Moreover, the above-described example implementation provides a sample traffic based self-learning malware detection solution that can automatically detect new/variants of malware (e.g., associated with C2 traffic).

Figure 4B:
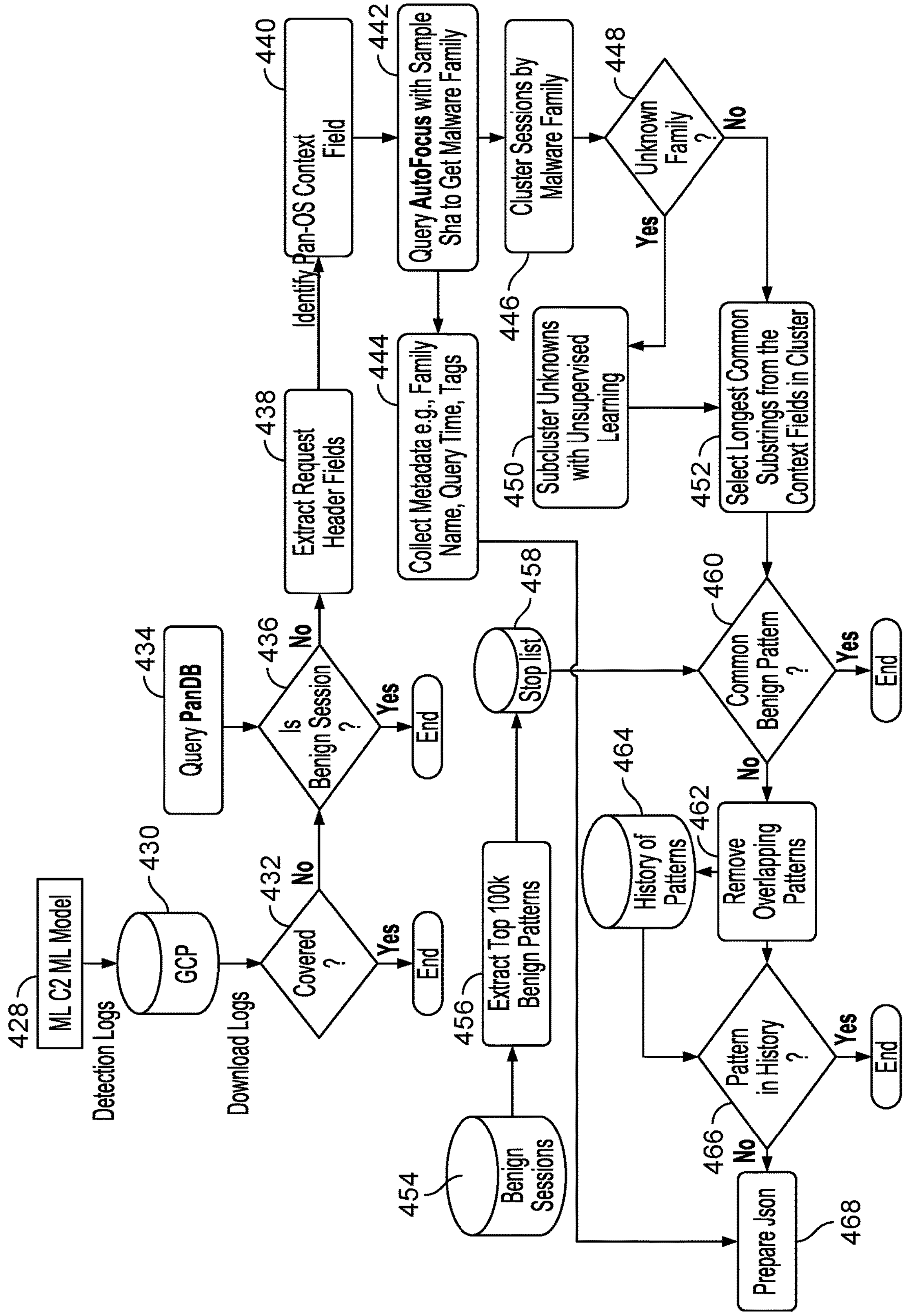
FIG. 4B illustrates a pattern extraction and signature generation processing workflow in accordance with some embodiments.

FIG. 4B illustrates a pattern extraction and signature generation processing workflow in accordance with some embodiments. As similarly discussed above, in various embodiments, self-learning system 404 performs automated pattern extraction and signature generation for new/variant malware samples. Specifically, FIG. 4B illustrates a pattern extraction and signature generation processing workflow for HTTP network traffic.

Referring to FIG. 4B, detection logs from C2 ML model 428 are stored in a cloud data store (e.g., Google Cloud Platform (GCP)) as shown at 430. The detection logs are detected and determined whether or not they have already been covered by prior analysis at 432. If no, the processing proceeds to 436. A query of known benign URLs is performed as shown at 434 (e.g., using a URL filtering service, such as PanDB, which is commercially available from Palo Alto Networks, Inc. headquartered in Santa Clara, Calif., or another publicly available URL filtering service can similarly be used). If the network traffic is not associated with a known benign URL, then further analysis proceeds at 438 to extract header request fields. At 440, additional information is extracted from the network traffic (e.g., pcap for the HTTP traffic) including, for example, a URL, a cookie, headers, and payloads (e.g., Pan-OS context field information). At 442, a query is performed with a hash (e.g., using SHA or another hashing algorithm) of the sample to determine an associated malware family if any (e.g., using a threat intelligence service, such as AutoFocus, which is commercially available from Palo Alto Networks, Inc. headquartered in Santa Clara, Calif., or another publicly available threat intelligence service can similarly be used, such as Virus Total, etc.). At 444, metadata (e.g., family name, query time, tags associated with the family, etc.) is collected for the matching malware family of the sample.

Clustering of sessions by malware family is performed at 446. At 448, whether the family is known or not is determined. If there is not an associated known family, then a subcluster operation of unknown malware samples with unsupervised learning is performed at 450. Otherwise, the malware sample is associated with a known malware family, and a longest common substring from the above-described context fields for each of the samples in the cluster is performed at 452. To ensure that the result is not associated with benign samples, benign session results are stored in a data store 454, and the top 100,000 benign patterns are extracted at 456 to generate a stop list at 458. At 460, whether the previously generated common benign pattern matches any results in the stop list is determined. If not, then processing proceeds to 462 to remove any overlapping patterns. A history of patterns is stored at data store 464, and a determination of whether the pattern is already stored in the history of patterns is determined at 466. If this is a new, non-overlapping pattern, then a JSON implementation of a new IPS signature based on the new, non-overlapping pattern is generated as shown at 468.

Example Use Cases of Sample Traffic Based Self-Learning Malware Detection

FIGS. 5A and 5B illustrate example pcaps of a malware sample that can be detected using the C2 ML model in accordance with some embodiments. Specifically, a sample that was not detected using an existing IPS signature but was detected using the disclosed C2 ML model generated two pcaps that are illustrated in FIGS. 5A and 5B. As a result, using the above-described techniques for sample traffic based self-learning malware detection, such as similarly described above with respect to FIGS. 1-4B, were performed to detect the sample as a new/variant malware and to automatically generate a new IPS signature as further described below with respect to FIG. 5C.

FIG. 5C illustrates an example of an automatically generated IPS signature in accordance with some embodiments. Specifically, as shown in FIG. 5C, the above-described techniques for sample traffic based self-learning malware detection, such as similarly described above with respect to FIGS. 1-4B, were performed to automatically generate a new IPS signature for the malware family LokiBot.

Additional example processes for the disclosed techniques for sample traffic based self-learning malware detection will now be described.

Example Processes for Sample Traffic Based Self-Learning Malware Detection

Figure 6:
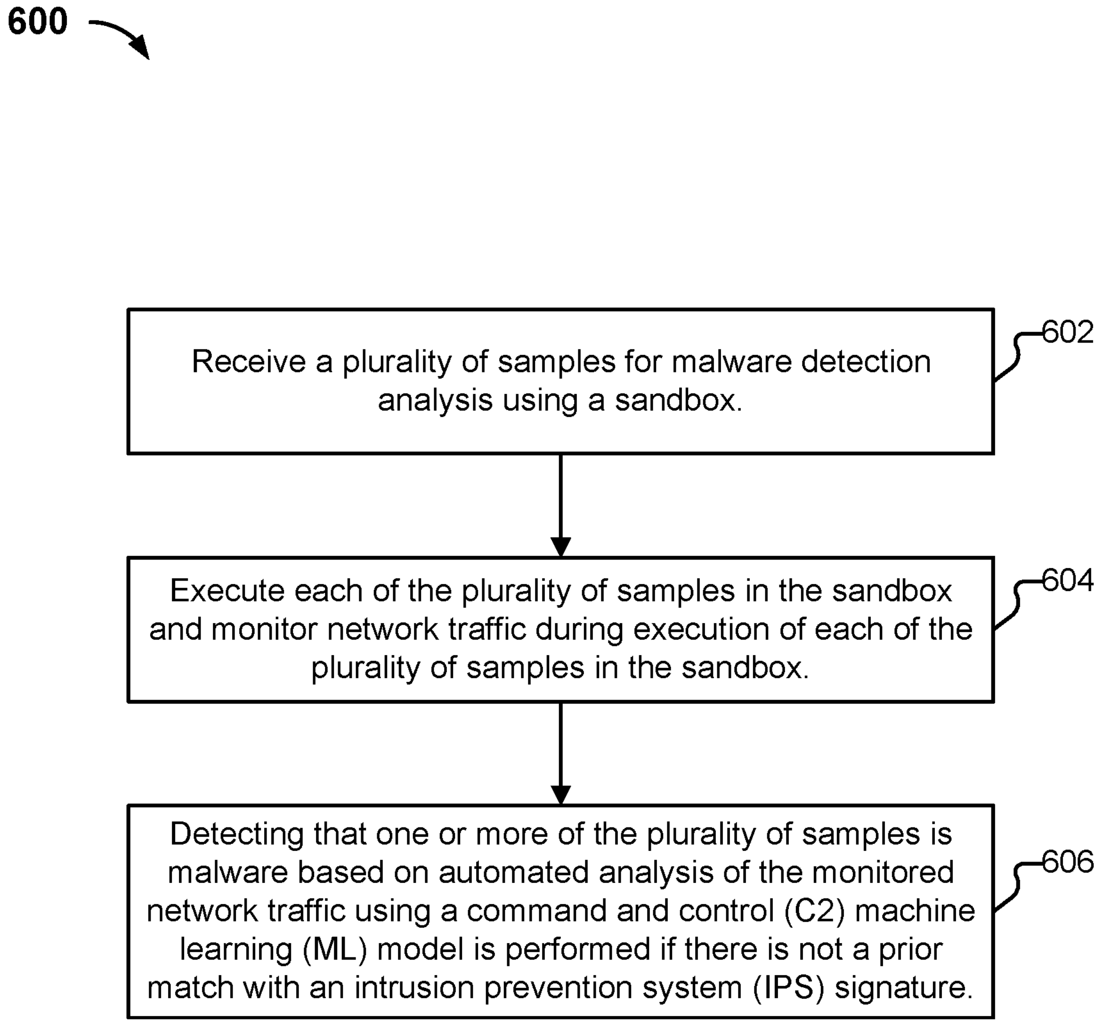
FIG. 6 is a flow diagram of a process for sample traffic based self-learning malware detection in accordance with some embodiments.

FIG. 6 is a flow diagram of a process for sample traffic based self-learning malware detection in accordance with some embodiments. In some embodiments, a process 600 as shown in FIG. 6 is performed by the security platform and techniques as similarly described above including the embodiments described above with respect to FIGS. 1-5C. In one embodiment, process 600 is performed by data appliance 102 as described above with respect to FIG. 1, security platform 122 as described above with respect to FIG. 1 (e.g., as a cloud-based security service), a virtual appliance (e.g., Palo Alto Networks' VM Series virtualized next generation firewalls, CN Series container next generation firewalls, and/or other commercially available virtual-based or container-based firewalls can similarly be implemented and configured to perform the disclosed techniques), an SDN security solution, a cloud security service, and/or combinations or hybrid implementations of the aforementioned as described herein.

At 602, a plurality of samples is received for malware detection analysis using a sandbox.

At 604, each of the plurality of samples is executed (e.g., emulated) in the sandbox and monitor network traffic during execution of each of the plurality of samples in the sandbox.

At 606, detecting that one or more of the plurality of samples is malware based on automated analysis of the monitored network traffic using a command and control (C2) machine learning (ML) model is performed if there is not a prior match with an intrusion prevention system (IPS) signature.

Figure 7:
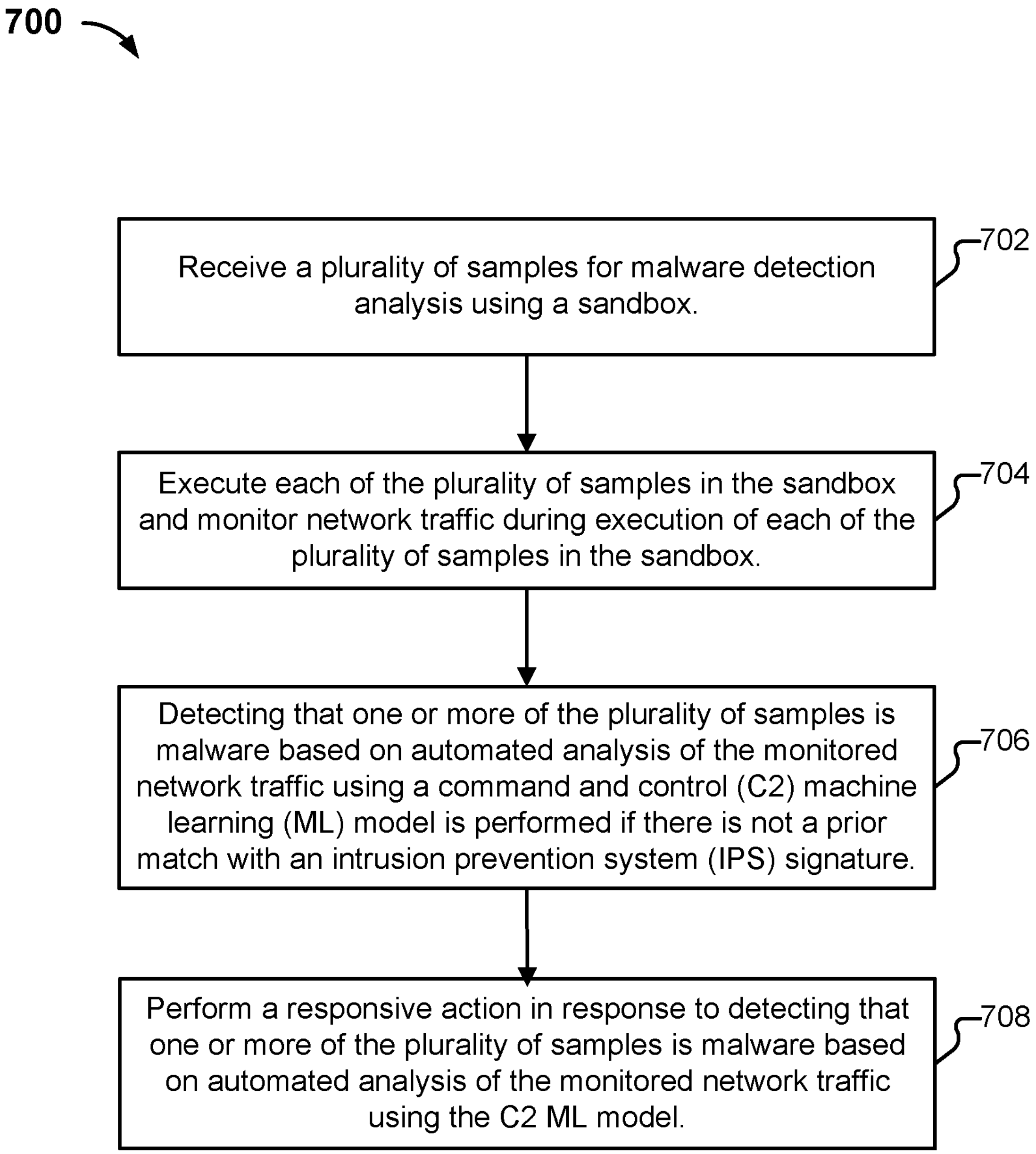
FIG. 7 is another flow diagram of a process for sample traffic based self-learning malware detection in accordance with some embodiments.

FIG. 7 is another flow diagram of a process for sample traffic based self-learning malware detection in accordance with some embodiments. In some embodiments, a process 700 as shown in FIG. 7 is performed by the security platform and techniques as similarly described above including the embodiments described above with respect to FIGS. 1-5C. In one embodiment, process 700 is performed by data appliance 102 as described above with respect to FIG. 1, security platform 122 as described above with respect to FIG. 1 (e.g., as a cloud-based security service), a virtual appliance (e.g., Palo Alto Networks' VM Series virtualized next generation firewalls, CN Series container next generation firewalls, and/or other commercially available virtual-based or container-based firewalls can similarly be implemented and configured to perform the disclosed techniques), an SDN security solution, a cloud security service, and/or combinations or hybrid implementations of the aforementioned as described herein.

At 702, a plurality of samples is received for malware detection analysis using a sandbox.

At 704, each of the plurality of samples is executed (e.g., emulated) in the sandbox and monitor network traffic during execution of each of the plurality of samples in the sandbox.

At 706, detecting that one or more of the plurality of samples is malware based on automated analysis of the monitored network traffic using a command and control (C2) machine learning (ML) model is performed if there is not a prior match with an intrusion prevention system (IPS) signature.

At 708, an action is performed in response to detecting that one or more of the plurality of samples is malware based on automated analysis of the monitored network traffic using the C2 ML model. As similarly described above with respect to FIGS. 4A-4B, malware associated with C2 traffic can be detected based on the verdict/results of the C2 ML model even if it is a new/variant malware and was not detected using a preexisting IPS signature. In an example implementation, the cloud-based and/or inline malware detector can generate a malware verdict based on the results of the automated analysis of the monitored network traffic during execution/emulation in the sandbox/instrumented emulation environment. The security platform (122) and/or data appliance (102) can then perform an action based on a policy (e.g., security/C2 related malware policy, which can be stored in policies 252 as shown in FIG. 2B) in response to the malware verdict. For example, the data appliance can be configured to block access to and/or storage of the sample if it is determined to be associated with a known malware packer (e.g., to prevent an endpoint device from receiving, storing, opening, and/or executing the sample). Other example actions can include logging the sample as determined to be associated with a known malware packer, blocking/dropping the sample, alerting an endpoint user and/or a network/security administrator that the sample was determined to be associated with a known malware packer, quarantining an endpoint device associated with the sample, identifying a source IP address, URL, etc. associated with the sample as malicious (or potentially malicious), and/or various other actions can also be performed based on the policy.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:

a processor configured to:

receive a plurality of samples for malware detection analysis using a sandbox;

execute each of the plurality of samples in the sandbox and monitor network traffic during execution of each of the plurality of samples in the sandbox;

detect that one or more of the plurality of samples is malware based on automated analysis of the monitored network traffic using a command and control (C2) machine learning (ML) model if there is not a prior match with an intrusion prevention system (IPS) signature; and perform an action in response to detecting that the one or more of the plurality of samples is malware based on the automated analysis of the monitored network traffic using the C2 ML model, wherein performing the action in response to detecting that the one or more of the plurality of samples is malware based on the automated analysis of the monitored network traffic using the C2 ML model further comprises the following for each of the detected malware samples:

send the network traffic from the malware sample to a self-learning system for further processing that includes clustering to identify whether the malware sample is associated with an existing C2 malware family and extracting a signature pattern from the network traffic associated with the malware sample, including extracting network traffic session information and payload, to automatically extract a pattern from the network traffic that is common to the existing C2 malware family to generate a new IPS signature; and a memory coupled to the processor and configured to provide the processor with instructions.

2. The system of claim 1, wherein one or more of the plurality of samples includes monitored HyperText Transfer Protocol (HTTP) traffic during execution in the sandbox.

3. The system of claim 1, wherein one or more of the plurality of samples includes monitored Internet Relay Chat (IRC) traffic during execution in the sandbox.

4. The system of claim 1, wherein one or more of the plurality of samples includes monitored Transmission Control Protocol (TCP) or User Datagram Protocol (UDP) traffic during execution in the sandbox.

5. The system of claim 1, wherein detecting that the one or more of the plurality of samples is malware based on the automated analysis of the monitored network traffic using the C2 ML model further comprises performing an initial attempt to match a preexisting IPS signature prior to performing the automated analysis of the monitored network traffic using the C2 ML model.

6. The system of claim 1, wherein detecting a previously unknown malware is performed using a security platform of a cloud service, wherein the security platform of the cloud service performs the detecting that the one or more of the plurality of samples is malware based on the automated analysis of the monitored network traffic using the C2 ML model.

7. The system of claim 1, wherein the processor is further configured to automatically generate a new IPS signature in response to detecting a previously unknown malware is performed using a security platform of a cloud service, wherein the security platform of the cloud service performs the detecting that the one or more of the plurality of samples is malware based on the automated analysis of the monitored network traffic using the C2 ML model.

8. The system of claim 1, wherein the processor is further configured to periodically update the C2 ML model.

9. A method, comprising:

receiving a plurality of samples for malware detection analysis using a sandbox;

executing each of the plurality of samples in the sandbox and monitoring network traffic during execution of each of the plurality of samples in the sandbox;

detecting that one or more of the plurality of samples is malware based on automated analysis of the monitored network traffic using a command and control (C2) machine learning (ML) model if there is not a prior match with an intrusion prevention system (IPS) signature; and performing an action in response to detecting that the one or more of the plurality of samples is malware based on the automated analysis of the monitored network traffic using the C2 ML model, wherein performing the action in response to detecting that the one or more of the plurality of samples is malware based on the automated analysis of the monitored network traffic using the C2 ML model further comprises the following for each of the detected malware samples:

sending the network traffic from the malware sample to a self-learning system for further processing that includes clustering to identify whether the malware sample is associated with an existing C2 malware family and extracting a signature pattern from the network traffic associated with the malware sample, including extracting network traffic session information and payload, to automatically extract a pattern from the network traffic that is common to the existing C2 malware family to generate a new IPS signature.

10. The method of claim 9, wherein one or more of the plurality of samples includes monitored HyperText Transfer Protocol (HTTP) traffic during execution in the sandbox.

11. The method of claim 9, wherein one or more of the plurality of samples includes monitored Internet Relay Chat (IRC) traffic during execution in the sandbox.

12. The method of claim 9, wherein one or more of the plurality of samples includes monitored Transmission Control Protocol (TCP) or User Datagram Protocol (UDP) traffic during execution in the sandbox.

13. The method of claim 9, wherein detecting that the one or more of the plurality of samples is malware based on the automated analysis of the monitored network traffic using the C2 ML model further comprises performing an initial attempt to match a preexisting IPS signature prior to performing the automated analysis of the monitored network traffic using the C2 ML model.

14. The method of claim 9, wherein detecting a previously unknown malware is performed using a security platform of a cloud service, wherein the security platform of the cloud service performs the detecting that the one or more of the plurality of samples is malware based on the automated analysis of the monitored network traffic using the C2 ML model.

15. The method of claim 9, further comprising automatically generating a new IPS signature in response to detecting a previously unknown malware is performed using a security platform of a cloud service, wherein the security platform of the cloud service performs the detecting that the one or more of the plurality of samples is malware based on the automated analysis of the monitored network traffic using the C2 ML model.

16. The method of claim 9, further comprising periodically updating the C2 ML model.

17. A computer program product embodied in a non-transitory computer readable medium and comprising computer instructions for:

receiving a plurality of samples for malware detection analysis using a sandbox;

executing each of the plurality of samples in the sandbox and monitoring network traffic during execution of each of the plurality of samples in the sandbox;

detecting that one or more of the plurality of samples is malware based on automated analysis of the monitored network traffic using a command and control (C2) machine learning (ML) model if there is not a prior match with an intrusion prevention system (IPS) signature; and performing an action in response to detecting that the one or more of the plurality of samples is malware based on the automated analysis of the monitored network traffic using the C2 ML model, wherein performing the action in response to detecting that the one or more of the plurality of samples is malware based on the automated analysis of the monitored network traffic using the C2 ML model further comprises the following for each of the detected malware samples:

sending the network traffic from the malware sample to a self-learning system for further processing that includes clustering to identify whether the malware sample is associated with an existing C2 malware family and extracting a signature pattern from the network traffic associated with the malware sample, including extracting network traffic session information and payload, to automatically extract a pattern from the network traffic that is common to the existing C2 malware family to generate a new IPS signature.

18. The computer program product of claim 17, wherein one or more of the plurality of samples includes monitored HyperText Transfer Protocol (HTTP) traffic during execution in the sandbox.

19. The computer program product of claim 17, wherein one or more of the plurality of samples includes monitored Internet Relay Chat (IRC) traffic during execution in the sandbox.

20. The computer program product of claim 17, wherein one or more of the plurality of samples includes monitored Transmission Control Protocol (TCP) or User Datagram Protocol (UDP) traffic during execution in the sandbox.

21. The system of claim 1, wherein the processor is further configured to periodically generate and update a training set for the C2 ML model based on results for malicious and benign network traffic using the self-learning system.

* * * * *